Sept. 14, 1926.                                                                    1,599,927
                        R. STRESAU
       PROCESS OF UNITING THICK METAL PLATES BY ELECTRIC WELDING
                        Filed Jan. 12, 1923
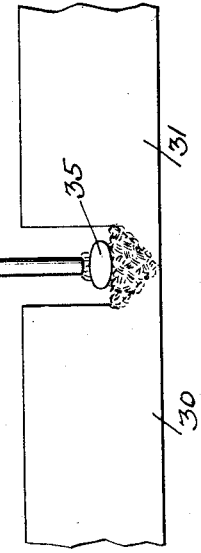
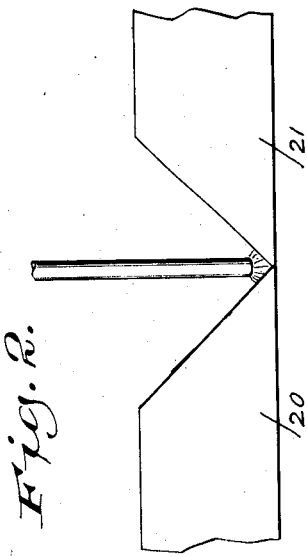
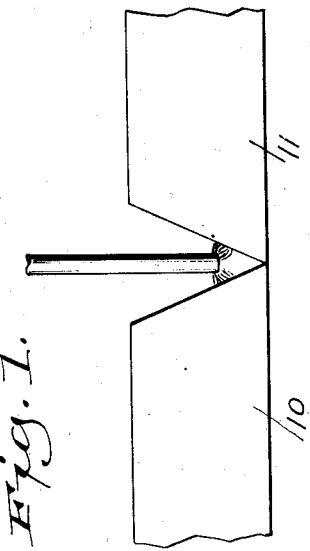
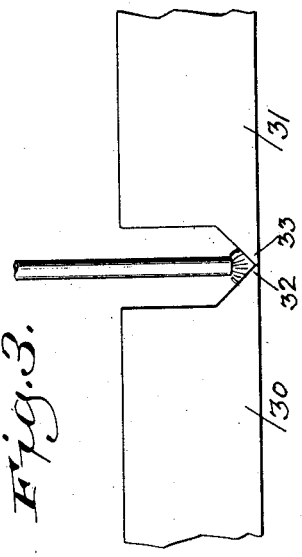
INVENTOR:
Richard Stresau,
BY
Erwin, Wheeler & Woolard
ATTORNEYS.

Patented Sept. 14, 1926.

1,599,927

UNITED STATES PATENT OFFICE.

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK.

PROCESS OF UNITING THICK METAL PLATES BY ELECTRIC WELDING.

Application filed January 12, 1923. Serial No. 612,263.

My invention relates to an improved method of electric welding which involves a preliminary preparation of the abutting edges of metal plates which are to be joined, the fusion and welding of such edges being effected by an electric arc formed at the point of an electrode or, preferably, a destructible weldrod, which conducts the welding current.

Much difficulty has been experienced heretofore in welding the edges of abutting metal plates of excessive thickness, by reason of the inability of the heat generated in the arc to penetrate the thick metal plates to the distance required to thoroughly fuse the abutting edges without burning away the metal.

In order to overcome the difficulty, it has been the practice to chamfer or mill the edges of the plates, so that when brought together in abutting relation a deep groove was formed for the purpose of enabling the arc to fuse the thinned edges of the plates at the bottom of the groove. Such V-shaped groove as ordinarily formed was narrow, as a matter of economy in the milling operations and in the quantity of welding metal required to fill the groove, and make a joint which was satisfactory from the stand-point of appearance. But under such conditions the arc did not play directly upon the thin edges of the plates at the bottom of the narrow V-groove, but would attack the metal at the sides thereof by reason of the shorter distance to be traveled when the arc was struck. As a result, the thin edges of the plates at the bottom of the groove were not as completely fused as was to be desired, and it was found that the molten metal flowing from the fusible weldrod was, in some instances, merely cast in the bottom of the groove without completely welding the plates at that point. An imperfect joint was thus produced.

Attempts to overcome this difficulty were made by widening the V-shaped groove, so that the free end of the weldrod could approach the bottom of the groove and permit the arc formed at the point of the weldrod to first completely fuse the thin edges of the plates at the bottom of the groove. But this practice necessitated the cutting away of a larger amount of material from the edges of the plates and an excessive consumption of the weldrod, when the metal flowing from the latter was used to form a filler for the groove.

In seeking to obviate the objections above described as inherent to the use of both wide and narrow V-grooves for welding, I have found that such objections may be completely overcome by milling the edges of the thick plates to be welded so as to produce, when assembled, a comparatively narrow welding groove, the upper side walls of which stand parallel or substantially so for a good part of their extent and with only the lower meeting edges chamfered or beveled to produce the desired thinness. When the plates are assembled, the point of the weldrod can be inserted into the bottom of the narrow groove and, by reason of the shorter distance, the arc will first play upon the thinned edges of the plates and fuse them so as to form the base for a perfect weld.

My present invention contemplates the shaping of the edges of thick metal plates, as described, so that when brought into abutting relation a narrow welding groove having parallel or substantially parallel side walls with thin edges meeting at the bottom of the groove will be formed. By this arrangement, the point of the weldrod is permitted to approach the bottom of the groove and yet be sufficiently removed from contact with the side walls thereof, so that the arc when struck will first play upon the beveled or chamfered thin edges of the plates at the bottom of the groove, and fuse the same in such complete degree that an entirely satisfactory weld will be produced. This initial welding is then followed by traversing the weldrod until the molten metal flowing therefrom, deposited in the successive layers has completely filled the groove, and constituted an integral structure of even surface. In the traversing movements of the weldrod across the width of the groove, the arc fuses the metal of the plates forming the vertical walls of the groove, so that at the completion of the welding operation a thoroughly welded joint is produced, which tests have shown to be superior in strength to that of the plates themselves. In addition to the advantages which flow from the initial but complete welding of the meeting edges at the bottom of the plates, a great economy is attained in the quantity of welding material required to fill the narrowly formed welding groove, and also in the lessened amount of material which is required to be cut away from the edges of the plates in order to form a welding groove which will meet the demands of the work.

In some instances it is desirable to impart to the welded joint, certain characteristics which are different from those of the plates or those of the weldrod. This result I may achieve by laying into the welding groove strips of manganese, nickel or other alloyed steels for the purposes of attaining the condition desired. These strips are fused in the welding operation and the alloyed steels incorporated into the weld. The practice last described is preferable to that of forming weldrods of special alloy, in which the greater resistance residing in such special weldrods cause them to become unduly heated by the electric current. It enables me also to maintain and use weldrods of standard quality, so that when it is desired to produce a weld having these characteristics, it is necessary only to make use of additional alloyed filler strips possessing the properties required. But in achieving this result, it will be within the scope of my invention to conduct the welding current and form the arc by means of an electrode, rather than a destructible weldrod.

My invention will now be described in detail and the novelty thereof pointed out in the appended claims.

In the drawing which accompanies this specification,

Figure 1 shows an ordinary method of butt welding thick metal plates with their edges beveled to form a narrow V-shaped welding groove, but which is objectionable for the reasons heretofore referred to.

Fig. 2 shows an improvement in the operation shown in Fig. 1, in that a perfect weld may be attained, but which is also objectionable in the particular that an excessive amount of welding material is required to fill the wide V-shaped groove and complete the weld.

Fig. 3 shows my improved method, this figure showing thick metal plates the abutting edges of which have been subjected to milling operations to produce a narrow, parallel sided groove for welding thoroughly and economically.

Fig. 4 illustrates the manner in which the welding is performed, this figure showing also the use of a filler strip of alloyed steel, designed to impart different characteristics to the weld.

In the drawing, Fig. 1 illustrates the older method of beveling by milling the edges of the thick gauge plates 10 and 11, at an angle of about 22½° from the perpendicular, so as to form a narrow V-shaped welding groove having a 45° opening at the juncture of the plates to be welded. This method is not satisfactory, inasmuch as the point of the weldrod can not approach the bottom of the groove before contacting with the sides thereof. From this condition it results that the arc will not reach the bottom of the groove, but will play upon the sides thereof some distance from the bottom. Under such conditions the thin contacting edges at the lower side of the plates are only partially fused, and the metal flowing from the fusible weldrod does not form a weld at that point, but appears in many instances merely as a cast filling at the bottom of the groove. As the imperfect weld formed at the bottom of the groove is built up to a level over which the arc can play transversely, the actual welding begins and from that point to the top level of the plates the metal at the sides of the groove is fused as the welding proceeds. The defect described has caused this manner of forming the groove to be discarded, on account of its inefficiency, notwithstanding the economical welding involved in its practice.

Fig. 2 shows a development of the later method whereby the edges of the plates 20 and 21 are cut away at a greater angle so as to form a wide V-shaped welding groove having an opening of about 90°, to permit the point of the weldrod to be inserted at the bottom of the groove, so that the arc will first fuse the lower thin edges of the plates. But this method is objectionable in that an excessive quantity of welding material is required to be supplied and fused in order to fill the groove and complete the weld.

Fig. 3 illustrates my present improved method, it involving a much more economical method of welding, in that the edges of the plates 30 and 31 are milled so that their sides stand in parallelism or substantial parallelism for a greater portion of their height, with the projecting edges at the bottom beveled substantially as in Fig. 2, to present the desired thin edges 32 and 33 at the bottom of the groove, and permit a complete fusion of such thin edges by the welding arc. The narrowed groove thus produced requires a less quantity of welding material to fill the groove and complete the weld. Herein reside the advantages of my invention; and I am thereby enabled to perfect the welded joint in a most economical manner, both in the extent of the machining operations involved and the amount of welding material required.

The plates 30 and 31, after milling, are placed in a welding machine, with the thin edges 32 and 33 in abutting or proximate relation. I prefer to employ a fusible weldrod 34, as distinguished from an electrode of fixed composition, to conduct the welding current to effect the weld. The width of the groove needs only to be such that the point of the weldrod may be readily entered to the depth thereof without diversion of the arc to the side walls of the groove, so that the welding arc may first completely fuse the thin edges 32 and 33, of the plates to institute the foundation of a complete weld. As the molten metal flowing from the weldrod fills the groove, the weldrod is traversed across the welding line, the metal at the sides of the groove being fused in the operation, until by successive layers of molten metal the groove is filled and the thoroughly welded joint completed.

As before indicated, it is sometimes desirable to impart to the welded joint certain characteristics not attainable by the use of a weldrod of standard composition. Instead of a specially constructed alloyed weldrod to meet each particular situation. I may use a standard type of weldrod adapted for all classes of welding, and arrange in the welding groove strips, slugs or bars 35 of manganese, nickel or other suitable metal as required. These elements 35 are fused by the arc and the metal constituting them is incorporated in the joint, so as to produce in the homogeneous weld the characteristics desired. By using a standard weldrod and strips of metal of the required characteristics, the cost of preparing specially alloyed weldrods is obviated, and the results sought for are attained by the use of additional welding strips proportioned in volume and content to the amount of material of the desired nature which is to be introduced into the welded joint so as to alloy the same.

The process of forming the welding groove in the economical manner described, is applicable also to the manufacture of pipe couplings or other tubular articles, in which the edges to be welded are brought into proximity by rolling or drawing a metal strip into annular form, the outer corners of the meeting edges being milled to produce a groove of the described outline, the welding operation thereafter being performed in the manner hereinbefore described.

Having thus described my invention, what I claim and desire to secure by Letters Patent of the United States, is:

1. In electric arc welding, the process of uniting metal plates which consists in cutting away the edges of the plates to form parallel or substantially parallel walls with thin edges extending from the lower sides thereof, assembling the said plates with the said thin edges in proximity to form a narrow welding groove, and fusing the plates in the region of the groove to weld the parts into an integral structure.

2. In electric arc welding, the process of uniting metal plates which consists in cutting away the edges of the plates to form parallel or substantially parallel walls with thin edges extending from the lower sides, assembling the said plates with the said thin edges in proximity to form a narrow welding groove, fusing the thin edges at the bottom of the groove to initiate the welding operation, and then fusing the walls of the groove and filling the latter with welding material to complete the weld.

3. In electric arc welding, the process of uniting metal plates which consists in cutting away the edges of the plates to form parallel or substantially parallel walls with thin edges extending from the lower sides, assembling the said plates with the said thin edges in proximity to form a narrow welding groove, fusing the thin edges at the bottom of the groove to initiate the welding operation, and then fusing the walls of the groove by means of an electric current conducted by a fusible weldrod and filling the said groove with welding material to complete the weld.

4. In electric arc welding, the process of uniting metal plates which consists in cutting away the edges of the plates to form parallel or substantially parallel walls with thin edges extending from the lower sides, assembling the said plates with the said thin edges in proximity to form a narrow welding groove, fusing the thin edges at the bottom of the groove by means of an electric current conducted by a fusible weldrod to initiate the welding operation, and then fusing the walls of the groove and filling the said groove with molten metal flowing from the weldrod to complete the welded joint.

In testimony whereof, I have signed my name at Milwaukee, this 9th day of January, 1923.

R. STRESAU.